United States Patent
Sato et al.

(10) Patent No.: US 12,419,215 B2
(45) Date of Patent: Sep. 23, 2025

(54) MOWER

(71) Applicant: TOYOTA JIDOSHA KABUSHIKI KAISHA, Toyota (JP)

(72) Inventors: Shinsuke Sato, Toyota (JP); Takehito Sakakibara, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 192 days.

(21) Appl. No.: 18/060,549

(22) Filed: Nov. 30, 2022

(65) Prior Publication Data

US 2023/0255138 A1 Aug. 17, 2023

(30) Foreign Application Priority Data

Feb. 16, 2022 (JP) ................... 2022-022373

(51) Int. Cl.
*A01D 34/00* (2006.01)

(52) U.S. Cl.
CPC ................... *A01D 34/008* (2013.01)

(58) Field of Classification Search
CPC .................................................. A01D 34/008
USPC .......................................................... 701/28
See application file for complete search history.

(56) References Cited

U.S. PATENT DOCUMENTS

| | | | | |
|---|---|---|---|---|
| 2016/0278289 A1* | 9/2016 | Kasai | ................... | A01D 34/736 |
| 2017/0057571 A1* | 3/2017 | Einola | ................... | B62D 55/12 |
| 2019/0346848 A1* | 11/2019 | Zhou | ................... | G05D 1/0088 |
| 2019/0357430 A1* | 11/2019 | Kraft | ................... | A01D 34/64 |
| 2020/0029490 A1* | 1/2020 | Bertucci | ................... | G05D 1/247 |
| 2020/0225673 A1* | 7/2020 | Ebrahimi Afrouzi | ................... | A47L 11/4011 |
| 2022/0124974 A1* | 4/2022 | Guan | ................... | A01D 34/866 |
| 2022/0137632 A1* | 5/2022 | Udagawa | ................... | G05D 1/0278 |
| | | | | 701/23 |

FOREIGN PATENT DOCUMENTS

| | | | | |
|---|---|---|---|---|
| EP | 2884364 B1 * | 9/2018 | ........... | A01D 34/008 |
| JP | H09128045 A | 5/1997 | | |
| JP | H10307627 A | 11/1998 | | |
| JP | 2000075032 A | 3/2000 | | |
| JP | 2004147963 A | 5/2004 | | |
| JP | 2018109849 A | 7/2018 | | |
| JP | 2021077003 A | 5/2021 | | |
| WO | 2018123632 A1 | 7/2018 | | |
| WO | WO-2018196000 A1 * | 11/2018 | ............. | G01S 17/42 |

OTHER PUBLICATIONS

Landships II, Trench Crossing Capability FT17, Aug. 9, 2009, activeboard.com (Year: 2009).*
English translation of EP-2884364-B1 (Year: 2018).*

* cited by examiner

Primary Examiner — Ramya P Burgess
Assistant Examiner — Preston Jay Miller
(74) Attorney, Agent, or Firm — Hunton Andrews Kurth LLP; Daniel Gregory Shanley

(57) ABSTRACT

A mower includes a mower main body and a controller. The mower main body includes a mowing blade for mowing grass. The controller identifies subsidence on a ground surface where the mower main body is not able to travel based on three-dimensional point cloud data composed of three-dimensional data of multiple positioning points in a target area, and sets a travel route of the mower main body by avoiding the identified subsidence.

3 Claims, 8 Drawing Sheets

MOWER

CROSS-REFERENCE TO RELATED APPLICATION

This application claims priority to Japanese Patent Application No. 2022-022373 filed on Feb. 16, 2022, incorporated herein by reference in its entirety.

BACKGROUND

1. Technical Field

The present disclosure relates to a mower.

2. Description of Related Art

Japanese Unexamined Patent Application Publication No. 9-128045 (JP 9-128045 A) discloses that a lawnmower is manually operated in a target area and at the same time surveying is performed using a global positioning system (GPS), and map data is obtained from survey data to create a movement route for the lawnmower.

SUMMARY

By the way, it is desirable that a travel route for a mower be created to avoid a place where the mower cannot travel, such as a place where a part of a ridge collapses and a part of a ground surface subsides.

However, as in the technique described in JP 9-128045 A, in a case where the mower is manually operated to perform the surveying for the entire target area, it is not easy because a huge amount of work is required when a vast arable land is targeted. Therefore, the above-mentioned related art has room for improvement in this respect.

In consideration of the above fact, an object of the present disclosure is to provide a mower that can easily set a travel route in consideration of the subsidence on the ground surface.

A mower according to a first aspect of the disclosure includes: a mower main body including a mowing blade for mowing grass; and a controller that identifies subsidence on a ground surface where the mower main body is not able to travel based on three-dimensional point cloud data composed of three-dimensional data of multiple positioning points in a target area, and sets a travel route of the mower main body by avoiding the identified subsidence.

The mower according to the first aspect of the disclosure identifies the subsidence on the ground surface where the mower main body is not able to travel based on the three-dimensional point cloud data composed of the three-dimensional data of the positioning points. Then, the travel route of the mower main body is set to avoid the identified subsidence. Thereby, for example, by obtaining the three-dimensional point cloud data from an aerial image of the target area, it is possible to easily set the travel route in consideration of the subsidence on the ground surface.

In the mower according to a second aspect of the disclosure, in the configuration according to the first aspect of the disclosure, the controller calculates inclination of a virtual route created by connecting multiple data points of the three-dimensional point cloud data, and identifies, based on a magnitude of the inclination of the virtual route, the subsidence on the ground surface where the mower main body is not able to travel.

In the mower according to the second aspect of the disclosure, by calculating the inclination of the virtual route obtained from the three-dimensional point cloud data, it is possible to identify the subsidence where the mower is not able to travel in consideration of a travel direction of the mower main body.

In the mower according to a third aspect of the disclosure, in the configuration according to the second aspect of the disclosure, the controller identifies as the subsidence on the ground surface where the mower main body is not able to travel when the magnitude of the inclination of the virtual route is greater than a first threshold and a route length of the virtual route is longer than a second threshold.

By the way, even in an area with deep subsidence, when the route length of the route passing through the subsidence area is short, it may be possible for the mower to get over the subsidence without avoiding the subsidence.

In the mower according to the third aspect of the disclosure, since the travel route can be set in consideration of the route length of the route passing through the subsidence are by the second threshold, it is possible to set the travel route where the mower gets over the subsidence and travels for small subsidence that does not affect travel of the mower main body.

In the mower according to a fourth aspect of the disclosure, in the configuration according to the third aspect of the disclosure, the second threshold is half a body length of the mower main body.

By the way, the subsidence where the mower is able to get over while driving is also different depending on a size of the body of the mower main body. For example, when the route length of the route passing through the subsidence area is greater than half the body length of the mower main body, it may be difficult for the mower to get over the subsidence and travel.

Therefore, in the mower according to the fourth aspect of the disclosure, the second threshold is set to half the body length of the mower main body. Thereby, the mower can determine whether the subsidence is subsidence where the mower main body is not able to travel in consideration of the size of the body of the mower main body.

In the mower according to a fifth aspect of the disclosure, in the configuration according to any one of the first to fourth aspects of the disclosure, the three-dimensional point cloud data is three-dimensional point cloud data of an orthophoto image of the target area, and based on the set travel route, the controller identifies an area where the mower main body does not travel in the target area as a no mowing area in association with the orthophoto image data.

In the mower according to the fifth aspect of the disclosure, based on the set travel route, the area that is not mowed by the mower is identified in association with the orthophoto image. This makes it easy to share the information on the no mowing area that requires manual mowing.

In the mower according to a sixth aspect of the disclosure, in the configuration according to the fifth aspect of the disclosure, the controller updates the no mowing area based on travel history of the mower main body.

In the mower according to the sixth aspect of the disclosure, the no mowing area is updated based on the travel history of the mower. As a result, even when the set travel route is changed and mowing of a part of the area is not performed for some reason, it is possible to find the no mowing area.

As described above, the mower according to the present disclosure has an excellent effect that the travel route can be set in consideration of the subsidence on the ground surface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, with reference to FIGS. 1 to 8, a mower 10 according to the present embodiment will be described. An arrow FR indicates a front side in a front-rear direction of the mower 10, an arrow UP indicates an upper side in an up-down direction, and an arrow RH indicates a right side in a right-left direction (width direction). Each of the arrows FR, UP, and RH is appropriately shown in each figure. Further, in the following description, when the front-rear, the up-down, and the right-left directions are used without special notes, the front-rear of the front-rear direction of the mower 10, the up-down of the up-down direction of the mower 10, and the right-left when the mower 10 faces a travel direction are shown.

Figure 1:
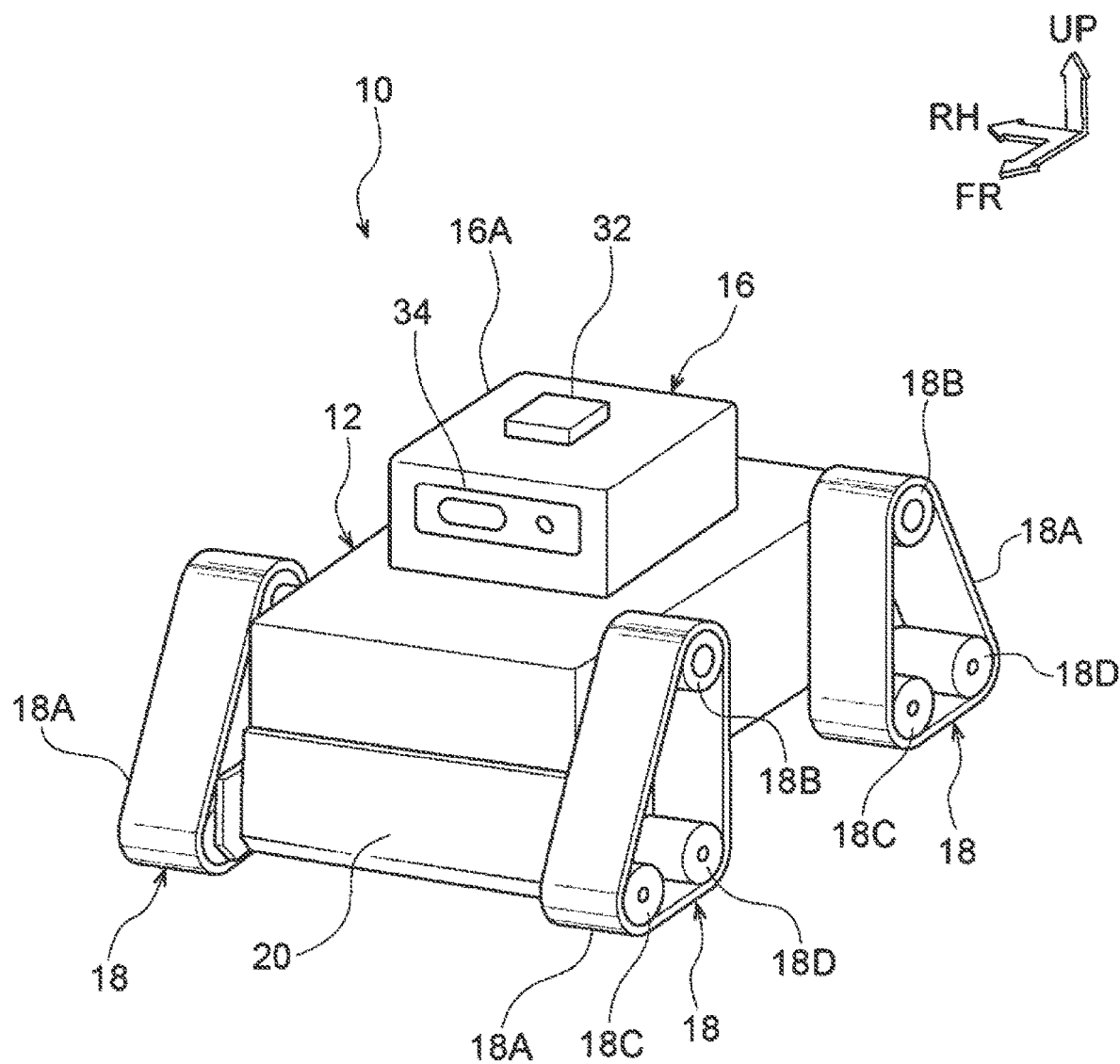
FIG. 1 is a perspective view of a mower according to a present embodiment at an oblique angle from above.
Figure 2:
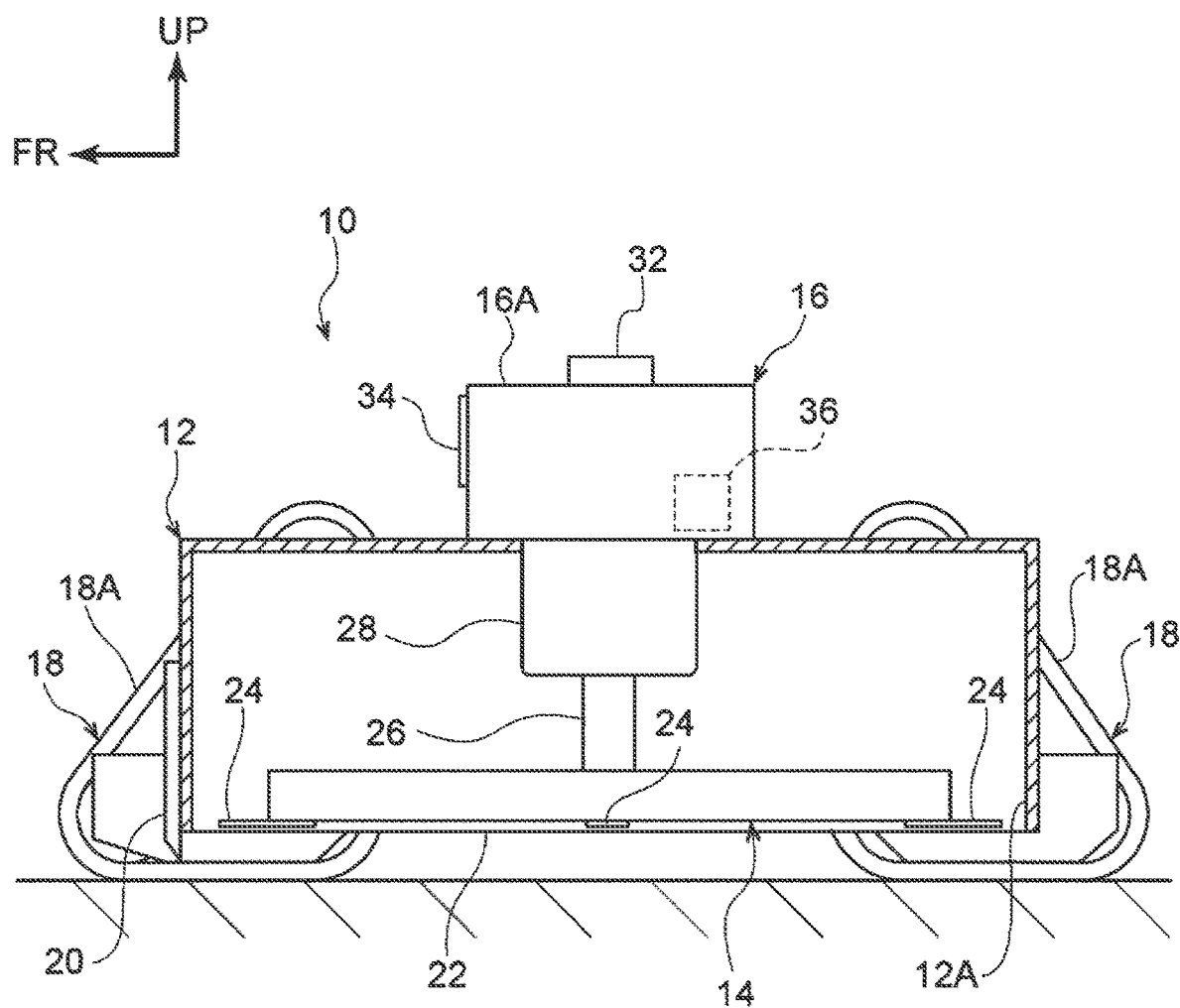
FIG. 2 is a side cross-sectional view showing the mower according to the present embodiment in a partially broken state when viewed from a side.

As shown in FIGS. 1 and 2, the mower 10 according to the present embodiment is mainly configured to include a main body 12, a mowing blade unit 14, and a control unit 16. The main body 12 corresponds to a "mower main body" in the present disclosure.

Main Body 12

The main body 12 has a substantially rectangular shape in which the lower side thereof is opened, and includes a crawler unit 18 as a moving mechanism. The crawler unit 18 is provided on both right and left sides at the front end portion of the main body 12 and on both right and left sides at the rear end portion of the main body 12.

Each crawler unit 18 includes a rubber crawler 18A, a drive wheel 18B, a first idler wheel 18C, and a second idler wheel 18D. The rubber crawler 18A has an endless band shape, and is wound around the drive wheel 18B, the first idler wheel 18C, and the second idler wheel 18D.

The drive wheel 18B is connected to a drive motor 35 (see FIG. 3) disposed inside the main body 12 via a rotation shaft (not shown). The drive motor 35 is configured such that electric power is supplied from a battery (not shown), and when the drive motor 35 is operated with the electric power supplied from the battery, the drive wheel 18B rotates and the rubber crawler 18A moves to circulate in one direction.

The first idler wheel 18C is disposed forward and downward with respect to the drive wheel 18B, and is rotatably attached to a rotation shaft (not shown) extending in the right-left direction. Then, the first idler wheel 18C rotates in accordance with the movement of the rubber crawler 18A. The second idler wheel 18D is disposed rearward with respect to the first idler wheel 18C and is rotatably attached to a rotation shaft (not shown) extending in the right-left direction. Then, the second idler wheel 18D rotates in accordance with the movement of the rubber crawler 18A.

Figure 3:
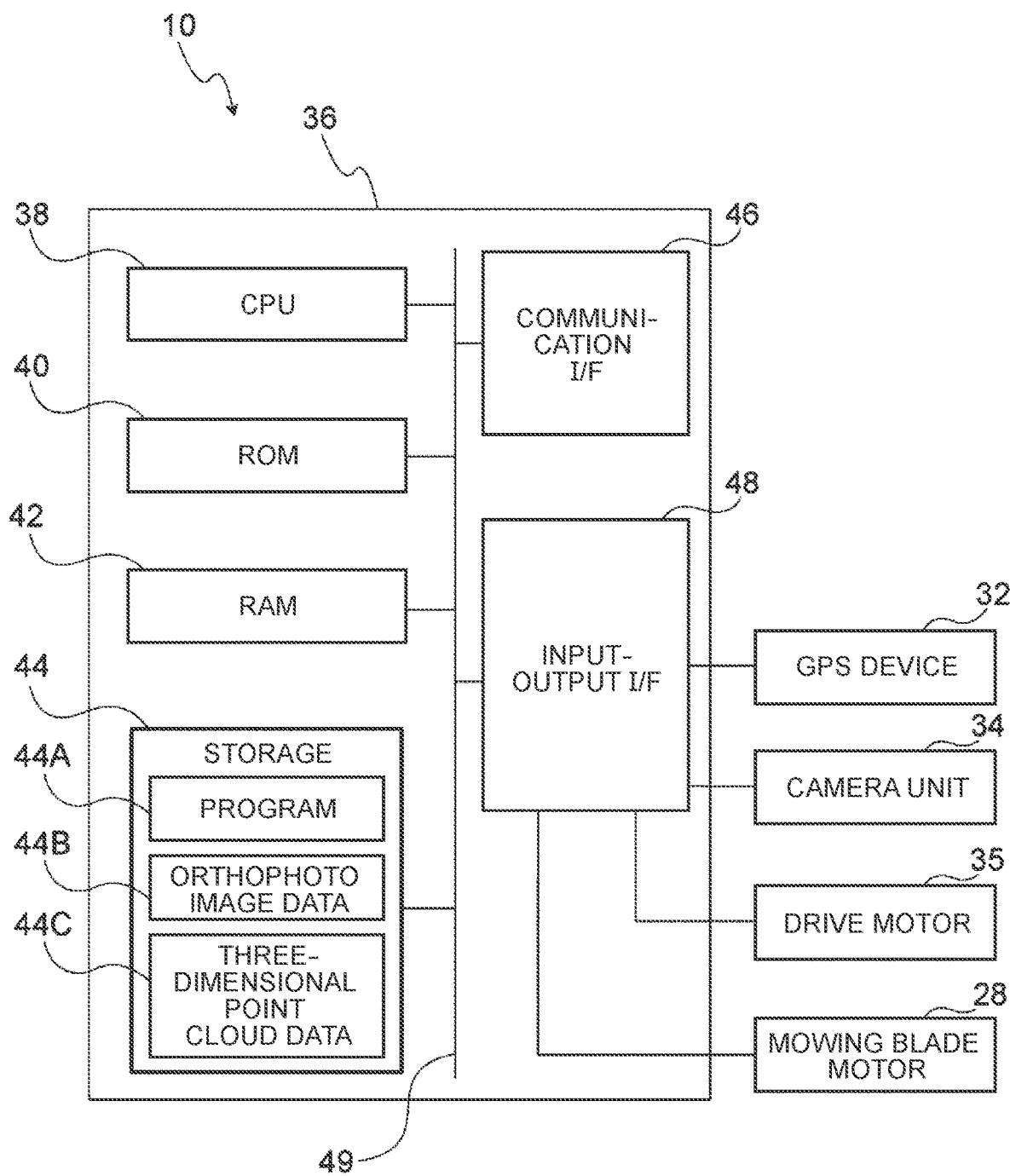
FIG. 3 is a block diagram showing a hardware configuration of the mower according to the present embodiment.

Here, the drive motor 35 is provided independently on each of the four crawler units 18, and when the four drive motors 35 are controlled, the mower 10 can be moved in any direction. In FIG. 3, the four drive motors 35 are collectively shown for convenience of description.

A cover 20 is provided on the front surface of the main body 12. The cover 20 is a substantially flat plate-shaped member with the front-rear direction as a plate thickness direction, and extends in the up-down direction and the right-left direction. The lower end of the cover 20 is located below the lower end of the main body 12, and a gap between the main body 12 and a ground is reduced by the cover 20. The cover 20 suppresses entry of foreign matter such as stones into the mowing blade unit 14 described below.

In the present embodiment, as an example, the cover 20 is provided only on the front surface of the main body 12, but providing the cover 20 is not limited the front surface thereof. For example, the same cover 20 may be provided on the rear surface and the side surface of the main body 12. Further, a member for suppressing entry of foreign matter may be provided on both side surfaces of the main body 12 in the same manner as the cover 20.

Mowing Blade Unit 14

As shown in FIG. 2, the mowing blade unit 14 is provided inside the main body 12. The mowing blade unit 14 is configured to include a rotating member 22, a mowing blade 24, a rotation shaft 26, and a mowing blade motor 28.

The rotating member 22 has a disk shape with the up-down direction as the plate thickness direction, and is disposed in the vicinity of an opening 12A on the lower side of the main body 12. Further, the rotating member 22 is fixed to the rotation shaft 26 described below, and is configured to be able to rotate together with the rotation shaft 26 with respect to the main body 12.

Multiple mowing blades 24 are provided in the rotating member 22. The mowing blade 24 is attached to the outer peripheral end portion of the rotating member 22, and in the present embodiment, as an example, four mowing blades 24 are provided at equal intervals along a circumferential direction of the rotating member 22.

Each mowing blade 24 is made of a thin metal member with the up-down direction as the plate thickness direction, and is configured to be able to cut grass.

The rotation shaft 26 is disposed in the central portion of the main body 12 and extends in the up-down direction, and the rotating member 22 is attached to the lower end portion of the rotation shaft 26. Further, the upper end portion of the rotation shaft 26 is connected to the mowing blade motor 28.

The mowing blade motor 28 is attached to the upper portion of the main body 12 and is driven with electric power supplied from a battery (not shown) provided in the main body 12. Further, the mowing blade motor 28 includes an output shaft (not shown), and the output shaft and the rotation shaft 26 are connected via a gear, a pulley, or the like (not shown). For this reason, when the mowing blade motor 28 is driven, rotational force is transmitted to the rotating member 22 via the rotation shaft 26, and the rotating member 22 rotates in one direction with the rotation shaft 26 as a center.

As shown in FIGS. 1 and 2, the control unit 16 is provided on the upper surface of the main body 12 and includes a substantially cuboid-shaped housing 16A.

A global positioning system (GPS) device 32 is attached to the upper surface of the housing 16A. The GPS device 32 is a device for measuring the current position of the mower 10, and is configured to include an antenna (not shown) that receives a signal from a GPS satellite.

A camera unit 34 as an imaging device is attached to the front surface of the housing 16A. The camera unit 34 is a unit configured by combining multiple cameras, and can capture an image of the surrounding situation including a travel direction of the mower 10. Further, the control unit 16 is provided with a controller 36.

Hardware Configuration of Mower 10

FIG. 3 is a block diagram showing a hardware configuration of the mower 10. As shown in FIG. 3, the controller 36 constituting the mower 10 is configured to include a central processing unit (CPU: processor) 38, a read-only memory (ROM) 40, a random access memory (RAM) 42, a storage 44, a communication interface (communication I/F) 46, and an input-output interface (input-output I/F) 48. Each configuration is communicably connected to each other via a bus 49.

The CPU 38 is a central processing unit, and executes various programs and controls various units. In other words, the CPU 38 reads the program from the ROM 40 or the storage 44 and executes the program using the RAM 42 as a work area. Further, the CPU 38 controls each of the above configurations and executes various arithmetic processes in accordance with the program recorded in the ROM 40 or the storage 44.

The ROM 40 stores various programs and various data. The RAM 42 is a non-transitory recording medium that temporarily stores a program or data as a work area. The storage 44 is a non-transitory recording medium that is composed of a hard disk drive (HDD) or a solid state drive (SSD), and stores various programs including an operating system and various data. In the present embodiment, the storage 44 stores a program 44A that is an automatic traveling program of the mower 10. When the program 44A is executed, a route setting process and a no mowing area identification process described below are executed. Further, the storage 44 stores various data including orthophoto image data 44B, three-dimensional point cloud data 44C, and travel history data and map data of the main body 12 of the mowing target area.

The communication I/F 46 is an interface for the mower 10 to communicate with other devices, and for example, standards such as a controller area network (CAN), Ethernet (registered trademark), long term evolution (LTE), fiber distributed data interface (FDDI), and Wi-Fi (registered trademark) are used.

The input-output I/F 48 is electrically connected to the GPS device 32, the camera unit 34, the drive motor 35, and the mowing blade motor 28. Then, the controller 36 controls the drive motor 35 based on information such as the surrounding image detected by the camera unit 34 and the current position of the mower 10 acquired by the GPS device 32 to cause the mower 10 to travel automatically.

Note that the controller 36 may cause the mower 10 to travel automatically based on a travel plan of the mower 10 acquired from the outside, the remaining amount of the battery (not shown), and the like.

Functional Configuration of Mower 10

The mower 10 realizes various functions using the above hardware resources. The functional configuration realized by the mower 10 will be described with reference to FIG. 4.

Figure 4:
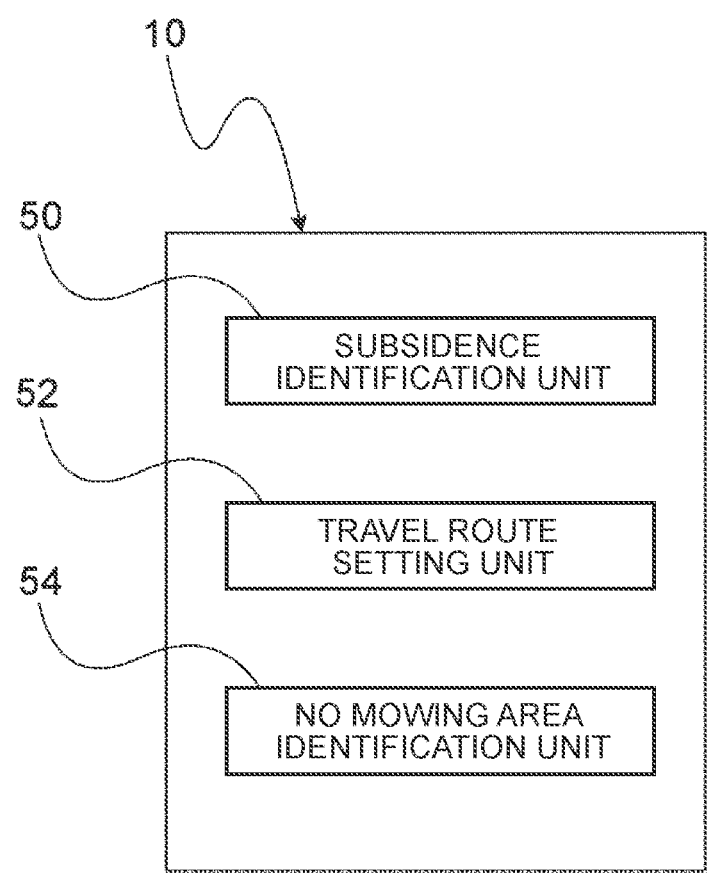
FIG. 4 is a block diagram showing a functional configuration of the mower according to the present embodiment.

As shown in FIG. 4, the mower 10 is configured to include a subsidence identification unit 50, a travel route setting unit 52, and a no mowing area identification unit 54 as functional configurations. Each functional configuration is realized as the CPU 38 reads and executes the program 44A stored in the ROM 40 or the storage 44.

The subsidence identification unit 50 identifies subsidence on the ground surface where the main body 12 cannot travel based on the three-dimensional point cloud data 44C of the mowing target area stored in the storage 44.

The three-dimensional point cloud data 44C are composed of three-dimensional data of multiple positioning points in the mowing target area, and are obtained, for example, in a process of creating the orthophoto image data 44B by aerial photogrammetry. Specifically, a control point as a reference point for a horizontal position and a height is installed at a position that can be clearly confirmed on an aerial photograph in which the image of the mowing target area is captured. Then, a camera mounted on a drone captures an image of the target area. Then, various data such as image data of the aerial photograph captured by the drone, an external control element of the image data, and survey data of the control point (control point achievement table data) are imported into a known digital stereoplotter and image analysis is performed, and an elevation value of each point on the image data is measured. Thereby, the three-dimensional point cloud data 44C of the multiple positioning points in the mowing target area can be obtained.

The orthophoto image data 44B is created by creating a numerical elevation model of the target area based on the three-dimensional point cloud data 44C, and performing an orthophoto conversion for correcting the position of a subject from the image data of the aerial photograph captured by the drone using the numerical elevation model. The numerical elevation model is model data in which three adjacent data points among the multiple data points included in the three-dimensional point cloud data 44C are connected to form a triangular triangulated irregular network (TIN) and the elevation is expressed in an evenly spaced lattice shape by interpolation applied to the shape of the ground surface. Therefore, the orthophoto image data 44B obtained using the numerical elevation model is displayed at the correct size and position without the inclination seen from directly above the subject on the image data, so that the orthophoto image data 44B is geospatial information that can be used to be superimposed on the map data and the like.

Figure 5:
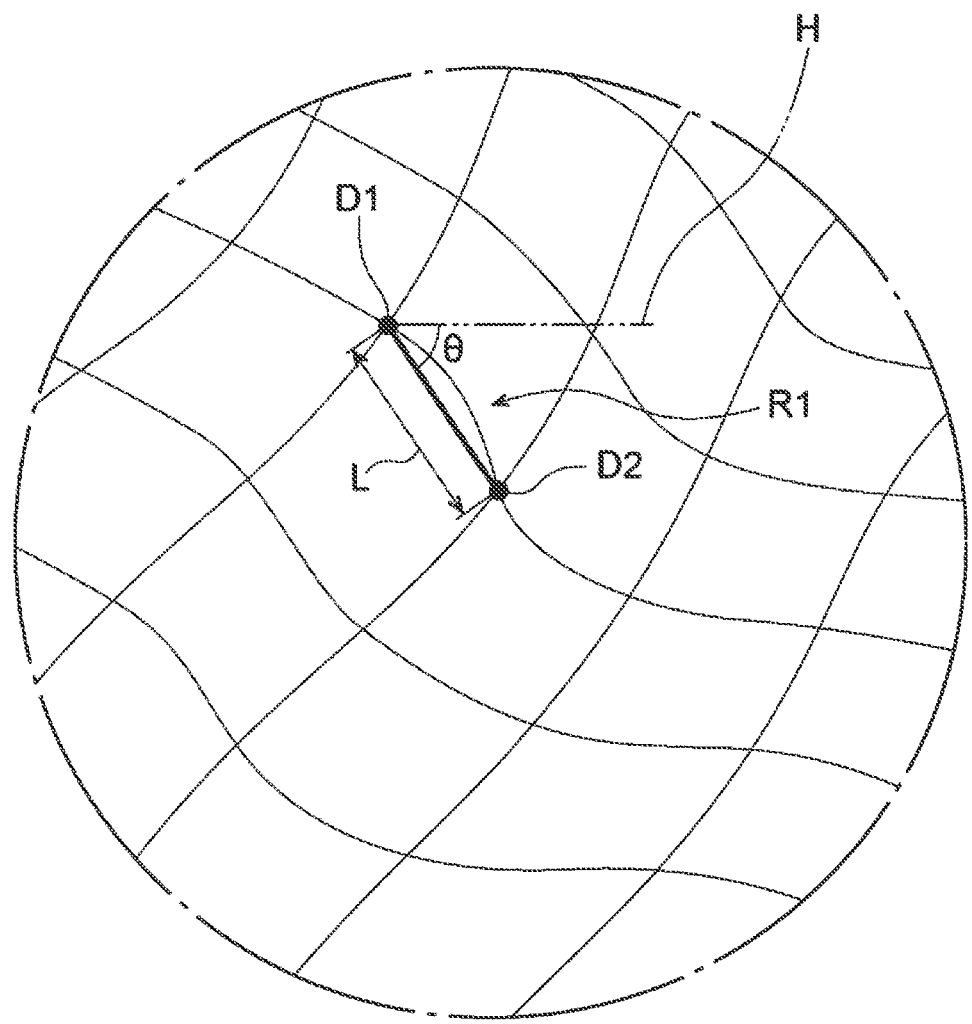
FIG. 5 is a schematic diagram showing an example of a virtual route created by connecting multiple data points included in three-dimensional point cloud data.

Here, as shown in FIG. 5, the subsidence identification unit 50 connects multiple data points (D1 and D2) included in the three-dimensional point cloud data 44C to form a virtual route R1, and calculates inclination $\theta$ of the virtual route R1 with respect to a horizontal position H as a reference. Then, based on the calculated inclination $\theta$ and a route length L of the virtual route R1, the subsidence identification unit 50 identifies the subsidence on the ground surface where the main body 12 of the mower 10 cannot travel. In the present embodiment, when the inclination of the virtual route R1 is greater than the first threshold and the route length L of the virtual route R1 is longer than the second threshold, the subsidence identification unit 50 identifies the virtual route R1 as a route including the subsidence on the ground surface where the main body 12 cannot travel.

The travel route setting unit 52 sets a travel route of the main body 12 of the mower 10 by avoiding the subsidence on the ground surface identified by the subsidence identification unit 50. Specifically, the travel route setting unit 52 sets a travel route by connecting data points of the three-dimensional point cloud data 44C of the target area. At this time, among multiple virtual routes R1 formed by the subsidence identification unit 50, a virtual route R1 passing through the subsidence on the ground surface where the main body 12 cannot travel is excluded from a candidate travel route. Thereby, it is possible to set a travel route on which the subsidence on the ground surface where the main body 12 cannot travel is avoided.

Figure 6:
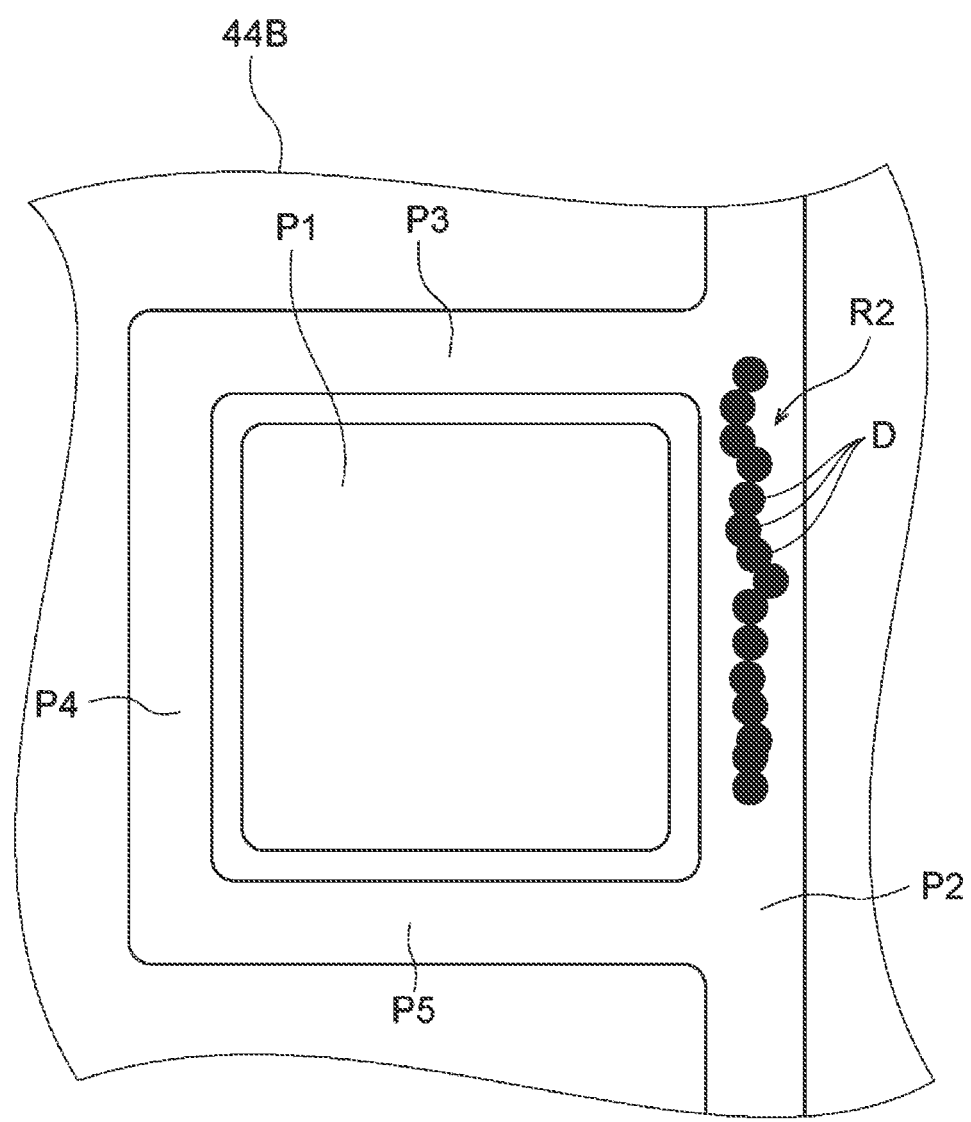
FIG. 6 shows a plan view showing an arable land and its surroundings.

FIG. 6 shows an example of a travel route R2 set on the orthophoto image data 44B of the arable land that is the mowing target area seen from above. Here, an area indicated by the reference sign P1 is an arable land such as rice fields and fields. Areas indicated by the reference signs P2 to P5 are ridges formed to surround the arable land. As shown in FIG. 6, the travel route R2 that extends in a straight line through a ridge P2 is set so as to connect multiple data points D included in the three-dimensional point cloud data 44C in the area.

The no mowing area identification unit 54 identifies a no mowing area in which mowing is not performed by the mower 10 within the mowing target area. Specifically, the no mowing area identification unit 54 identifies an area in which mowing cannot be performed for terrain reasons from route information of the set travel route R2 and the orthophoto image data 44B of the target area, that is, an area where the main body 12 cannot travel. Then, the identified area is stored as a "no mowing area" in association with the orthophoto image data 44B. When the stored data is shared with an external terminal such as wired communication or wireless communication, it is possible to share the no mowing area that requires manual mowing with the outside visually and in a simple way.

Further, the no mowing area identification unit 54 acquires travel history of the main body 12 according to a user request or in a predetermined time cycle, and updates the no mowing area based on information on the route where the main body 12 actually travels. As a result, even when the set travel route R2 is changed and mowing of a part of the area is not performed for some reason, it is possible to find the no mowing area.

Effect

Next, the effect of the present embodiment will be described.

Route Setting Process

Figure 7:
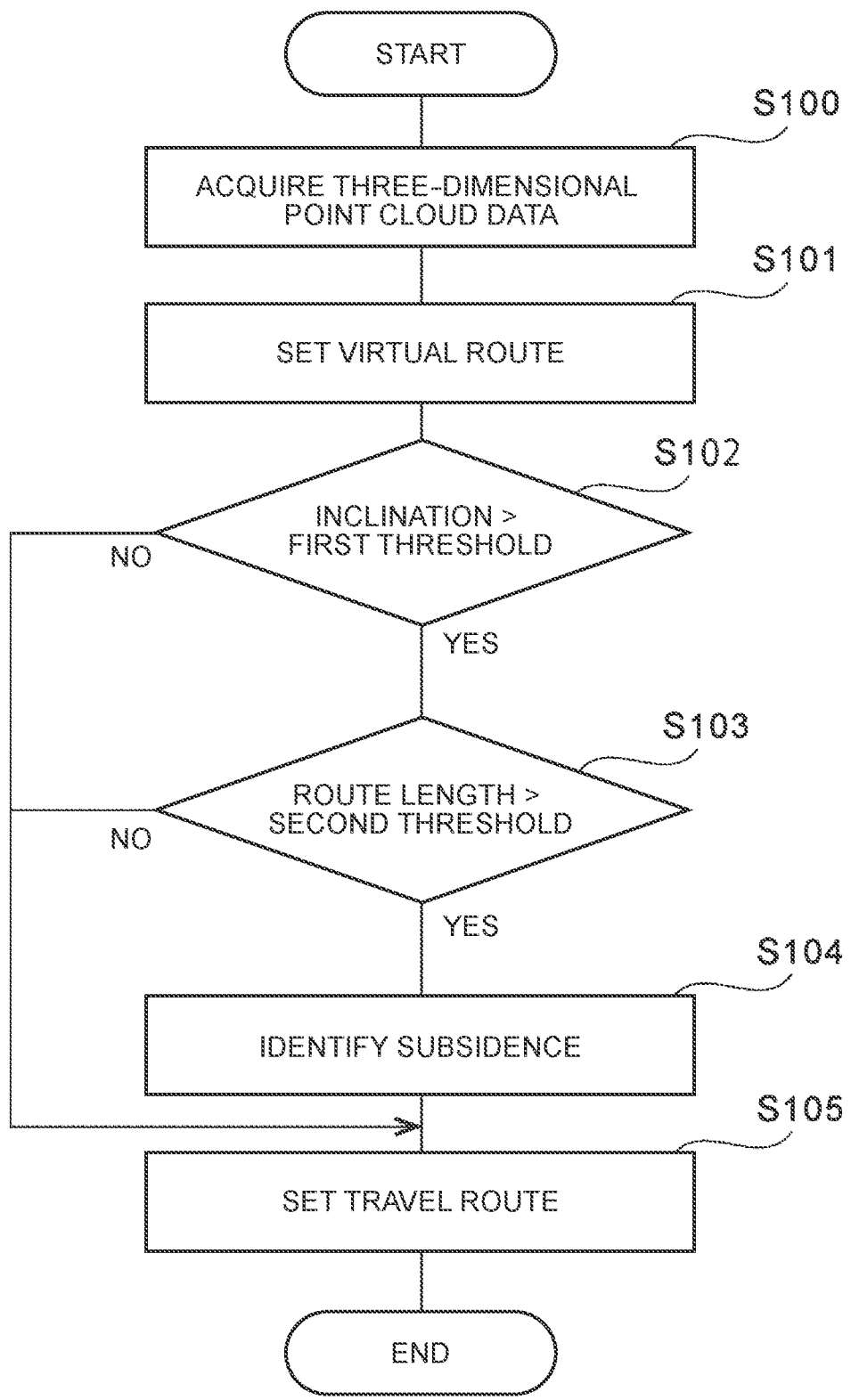
FIG. 7 is a flowchart showing an example of a flow of a route setting process according to the present embodiment.

FIG. 7 is a flowchart showing an example of a flow of a route setting process by the mower 10. This route setting process is executed by the CPU 38 reading the program 44A from the ROM 40 or the storage 44 and expanding it to the RAM 42.

As shown in FIG. 7, the CPU 38 acquires the three-dimensional point cloud data 44C stored in the storage 44 in step S100.

The CPU 38 sets the virtual route R1 in step S101. Specifically, as shown in FIG. 5, multiple data points included in the three-dimensional point cloud data 44C are connected to form the virtual route R1, and the inclination θ and the route length L of the virtual route R1 are calculated.

In step S102, the CPU 38 determines whether the inclination θ of the virtual route R1 is greater than the first threshold. When the inclination θ calculated in step S101 is greater than the first threshold, the process proceeds to step S103. On the other hand, when the CPU 38 determines that the inclination θ is equal to or less than the first threshold, the process proceeds to step S105 and sets the travel route. That is, when the inclination θ is equal to or less than the first threshold, it is determined that the main body 12 can travel through the virtual route R1, and the travel route R2 (see FIG. 6) can be set without excluding the virtual route R1.

In step S103, the CPU 38 determines whether the route length L of the virtual route R1 is longer than the second threshold. When the route length L calculated in step S101 is longer than the second threshold, the process proceeds to step S104 to identify the subsidence on the ground surface. That is, the identified virtual route R1 is identified as a route where the main body 12 cannot travel. On the other hand, when the CPU 38 determines that the route length L is equal to or less than the second threshold, the process proceeds to step S105 and sets the travel route. That is, when the route length L is equal to or less than the second threshold, it is determined that the deep subsidence is a subsidence small enough for the main body 12 to get over, and the travel route R2 can be set without excluding the virtual route R1.

The CPU 38 proceeds to step S105, sets the travel route R2 of the main body 12, and ends the route setting process. Specifically, the multiple data points included in the three-dimensional point cloud data 44C acquired in step S100 are connected to set the travel route R2. Here, the CPU 38 sets the travel route R2 by excluding the virtual route R1 passing through the subsidence on the ground surface identified in step S104. Thereby, it is possible to set a route on which the subsidence on the ground surface where the main body 12 cannot travel is avoided.

No Mowing Area Identification Process

Next, with reference to the flowchart of FIG. 8, an example of a flow of the no mowing area identification process by the mower 10 will be described. This no mowing area identification process is executed by the CPU 38 reading the program 44A from the ROM 40 or the storage 44 and expanding it to the RAM 42.

Figure 8:
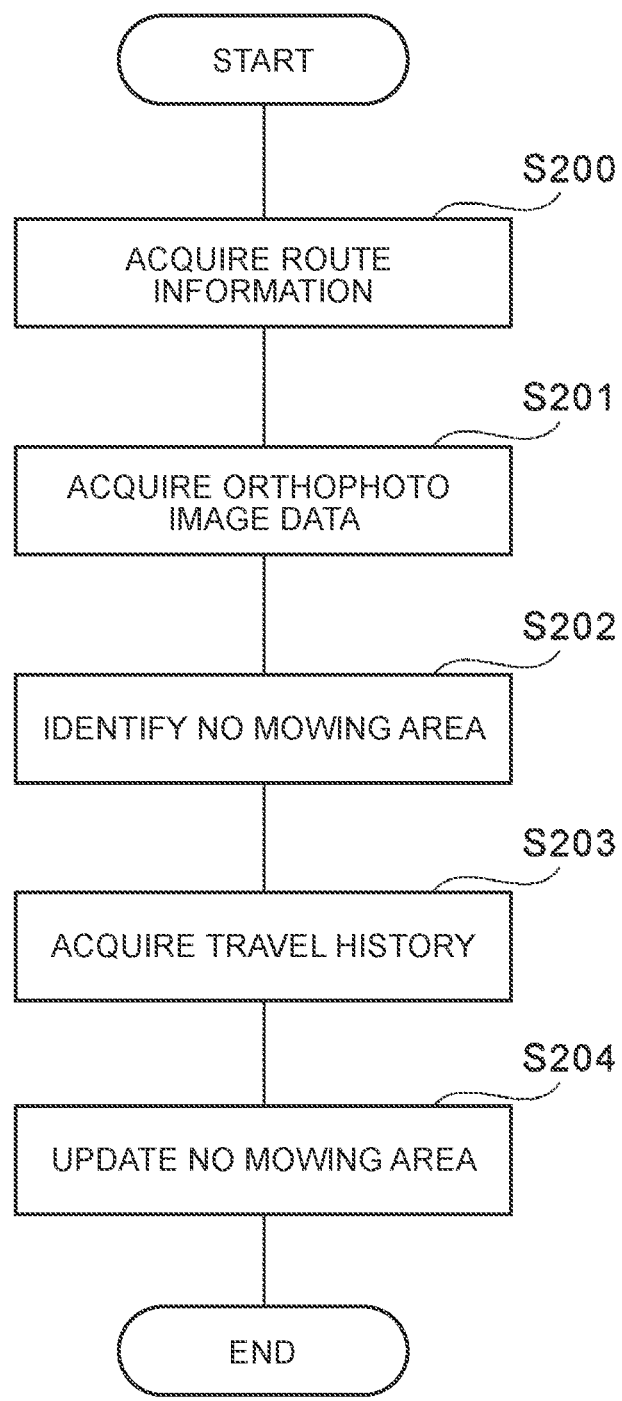
FIG. 8 is a flowchart showing an example of a flow of a no mowing area identification process according to the present embodiment.

As shown in FIG. 8, the CPU 38 acquires route information related to the travel route R2 set based on the function of the travel route setting unit 52 in step S200.

In step S201, the CPU 38 acquires the orthophoto image data 44B of the mowing target area corresponding to the acquired route information.

In step S202, the CPU 38 identifies the no mowing area based on the acquired route information and the orthophoto image data 44B. Specifically, an area where mowing cannot be performed for some terrain reason, such as a place where a large subsidence exists on the ground surface or a place where the width of the ridge is narrow, that is, an area where the main body 12 cannot travel, is identified as a "no mowing area". Then, the CPU 38 identifies and stores the "no mowing area" in association with the orthophoto image data 44B.

In step S203, the CPU 38 acquires the travel history of the main body 12, proceeds to step S204, updates the information on the stored no mowing area, and ends the process.

As described above, in the mower 10 of the present embodiment, based on the three-dimensional point cloud data 44C in the mowing target area, the subsidence on the ground surface where the main body 12 cannot travel is identified. Then, the travel route of the main body 12 is set to avoid the identified subsidence. Thereby, for example, the three-dimensional point cloud data 44C is obtained from an aerial image of the target area, so that it is possible to easily set the travel route in consideration of the subsidence on the ground surface.

Specifically, as shown in FIG. 5, the mower 10 calculates the inclination θ and the route length L of the virtual route R1 formed by connecting the multiple data points of the three-dimensional point cloud data 44C. Then, when the magnitude of the inclination θ is greater than the first threshold and the route length L is longer than the second threshold, the position of the virtual route R1 is identified as the subsidence on the ground surface where the main body 12 cannot travel.

As described above, the inclination of the virtual route R1 obtained from the three-dimensional point cloud data 44C is calculated, so that the subsidence where the main body 12 cannot travel can be identified in consideration of the travel direction of the main body 12. Further, since the travel route can be set in consideration of the route length of the route passing through the subsidence area by the second threshold, it is possible to set a travel route where the main body 12 gets over the subsidence and travels for the small subsidence that does not affect travel of the main body 12.

By the way, the subsidence where the main body 12 is able to get over while driving is also different depending on a size of the body of the main body 12. For example, when the route length L of the route passing through the subsidence area is greater than half the body length of the main body 12, it may be difficult for the main body 12 to get over the subsidence and travel.

Therefore, in the mower 10 according to the present embodiment, the second threshold is set to a length that is half the body length of the main body 12. Thereby, the mower 10 can determine whether the subsidence is subsidence where the main body 12 is not able to travel in consideration of the size of the body of the main body 12.

In the mower 10, based on the set travel route R2, the no mowing area of the mower 10 is identified in association with the orthophoto image data 44B. As a result, it is possible to easily share information on the no mowing area that requires manual mowing with an external terminal.

Further, the information on the no mowing area is updated based on the travel history of the mower 10 (main body 12). As a result, even when the set travel route R2 is changed and mowing of a part of the area is not performed for some reason, it is possible to find the no mowing area.

It should be noted that various processors other than the CPU may execute a process executed by the CPU when the CPU reads the software (program) in the above embodiment. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, each process may be executed by one of these various processors, or a combination of two or more processors of the same type or different types (for example, a combination of multiple FPGAs, a combination of a CPU and an FPGA, and the like). The hardware structure of these various processors is, more specifically, an electric circuit in which circuit elements such as semiconductor elements are combined.

In each of the above embodiments, a configuration in which various programs and data are stored in the storage 44 is adopted, but the configuration is not limited to this. The program and the data may be recorded on a non-transitory recording medium such as a compact disc read-only memory (CD-ROM), a digital versatile disc read-only memory (DVD-ROM), and a universal serial bus (USB) memory to be provided. The program and the data may also be downloaded from an external device via a network to be provided.

What is claimed is:

1. A mower comprising:
   a mower main body;
   crawlers each provided on both right and left sides at a front end portion of the mower main body and on both right and left sides at a rear end portion of the mower main body, wherein the crawlers each include a drive wheel, a first idler wheel and a second idler wheel;
   a motor mounted on the mower main body;
   a rotation shaft including a lower end and an upper end, the upper end being connected to the motor;
   a rotating member attached to the lower end of the rotation shaft, the rotating member including a periphery, the rotating member has a disk shape and a plurality of mowing blades are provided at equal intervals along a circumferential direction of the rotating member;
   the plurality of mowing blades attached to the periphery of the rotating member; and
   one or more processors configured to:
   create a virtual route by connecting multiple data points of three-dimensional point cloud data, wherein the three-dimensional point cloud data is composed of three-dimensional data of multiple positioning points in a target area,
   obtain an inclination angle and a route length of the virtual route,
   when the inclination angle is greater than a first threshold value and the route length is greater than a second threshold value, identify subsidence on a ground surface where the mower main body is not able to travel, wherein the second threshold value is half a body length of the mower main body, wherein the route length is a length of a line connecting two data points of the three-dimensional point cloud data,
   the three-dimensional point cloud data are composed of three-dimensional data of multiple positioning points in the target area and are obtained in a process of creating orthophoto image data created by a numerical elevation model of the target area and captured by a drone by aerial photogrammetry,
   the one or more processors are further configured to identify, based on the set travel route, an area where the mower main body does not travel in the target area as a no mowing area in association with the orthophoto image data, and
   wherein the one or more processors are further configured to update the no mowing area based on travel history of the mower main body; and
   set a travel route of the mower main body by avoiding the identified subsidence.

2. The mower according to claim 1, wherein the one or more processors are further configured to
   create a plurality of virtual routes,
   obtain the inclination angle and the route length for each of the plurality of virtual routes,
   determine whether the inclination angle of each of the plurality of virtual routes is greater than the first threshold value,
   determine whether the route length of each of the plurality of virtual routes is greater than the second threshold value,
   for a first virtual route out of the plurality of virtual routes, when the inclination angle is greater than the first threshold value and the route length is greater than the second threshold value, identify the subsidence on the ground surface where the mower main body is not able to travel, and set the travel route of the mower main body by excluding the first virtual route.

3. The mower according to claim 1, wherein the virtual route is inclined with respect to a reference horizontal line, and the route length is a length of the inclined virtual route from one data point to another data point of the three-dimensional point cloud data.

* * * * *